March 7, 1967  J. H. ST. JOHN  3,308,365
POLARITY CONTROL SYSTEM
Filed April 26, 1963  3 Sheets-Sheet 1

INVENTOR
JOHN H. St JOHN

BY
Semmes & Semmes
ATTORNEYS

March 7, 1967  J. H. ST. JOHN  3,308,365
POLARITY CONTROL SYSTEM
Filed April 26, 1963  3 Sheets-Sheet 2
FIG. 4
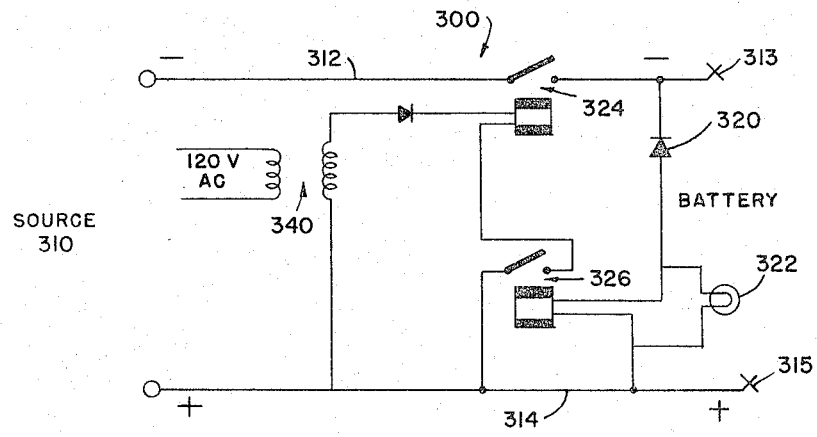
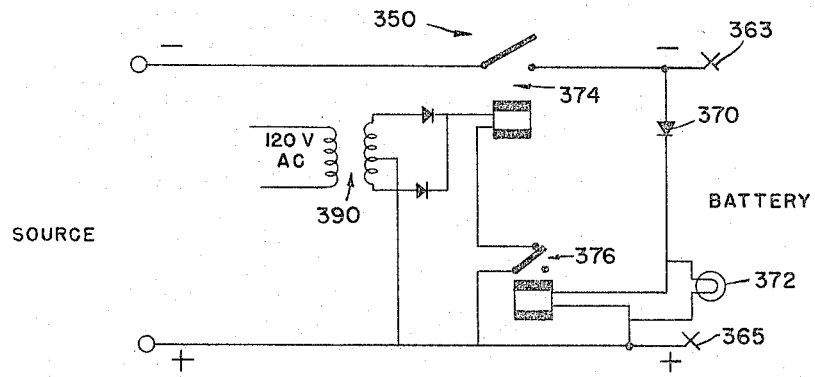
FIG. 5
INVENTOR
JOHN H. St JOHN
BY *Semmes & Semmes*
ATTORNEYS March 7, 1967 J. H. ST. JOHN 3,308,365
POLARITY CONTROL SYSTEM
Filed April 26, 1963 3 Sheets-Sheet 3
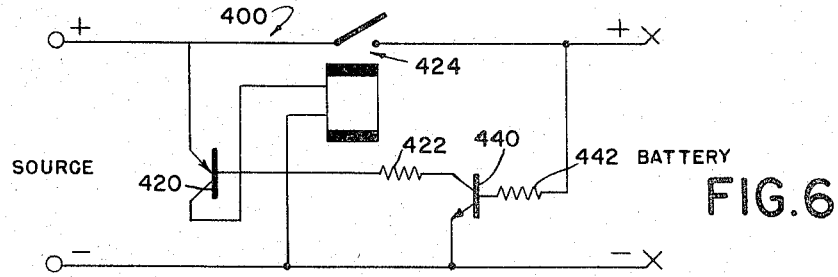
FIG.6
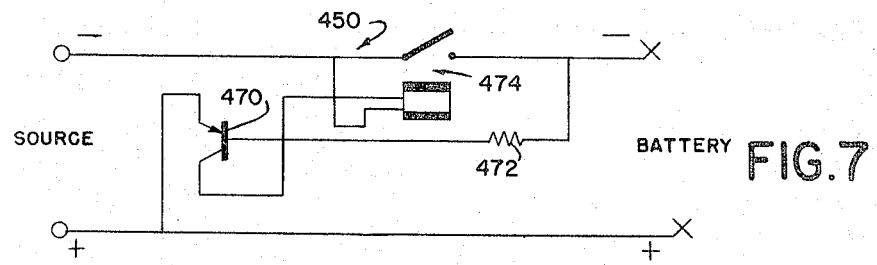
FIG.7
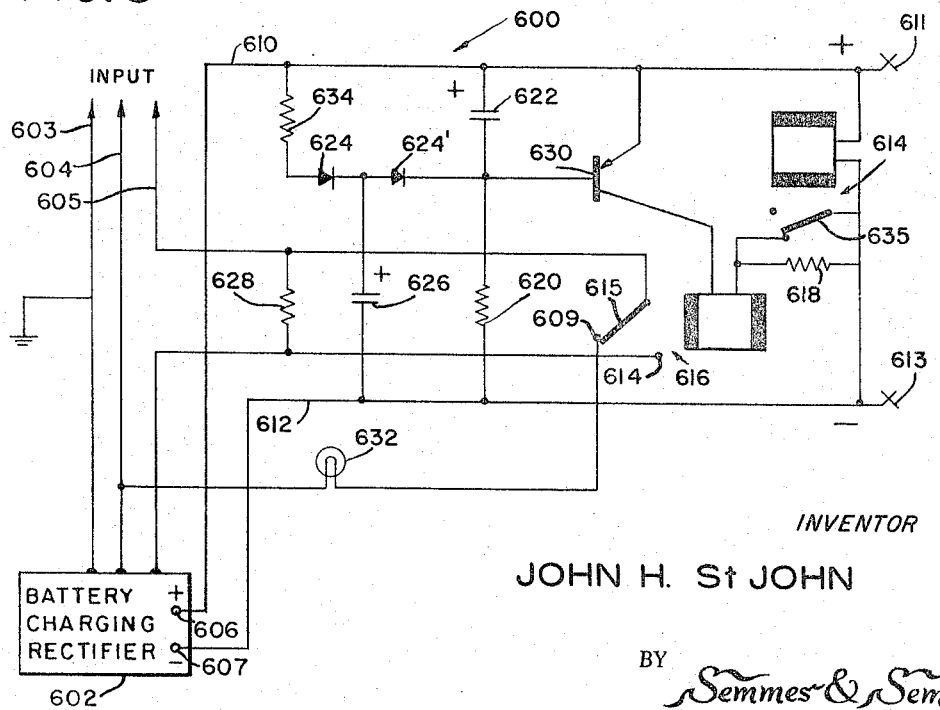
INVENTOR
JOHN H. St JOHN
BY *Semmes & Semmes*
ATTORNEYS United States Patent Office 3,308,365
Patented Mar. 7, 1967

3,308,365
POLARITY CONTROL SYSTEM
John H. St. John, Bogota, N.J., assignor to Marquette Corporation, Minneapolis, Minn., a corporation of Delaware
Filed Apr. 26, 1963, Ser. No. 276,037
5 Claims. (Cl. 320—25)

The present invention relates to storage battery charging or boosting. More especially it concerns means to insure that charging current is applied to such batteries in the correct polarity only. These papers constitute a continuation-in-part of copending application Serial No. 145,951 entitled, Polarity Control System, filed October 18, 1961.

The emergence of the silicon diode as a practical rectifier for battery charging from the standpoint of economics, efficiency, rectifier size and availability thereof, created the need for a means of protection to avoid rectifier destruction by reverse battery connection in a battery charging rectifier. Prior to this time the selenium rectifier with its resilience and ability to withstand heavy overloads for short periods of time, required no such protection. The silicon diode on the other hand, under severe overloads, can be destroyed instantly. As is known, the effect of reverse polarity in a rectifier application is to produce currents through the rectifier of up to ten times normal charging current. Overloads of this order of magnitude will instantly destroy a silicon diode whereas a selenium rectifier can successfully withstand this treatment for reasonably short periods of time.

The recent introduction of the alternator as a device for maintaining batteries in passenger cars has created the need for a fool-proof method of protecting against inadvertent reverse connection of a battery charger to a battery installed in an alternator equipped vehicle in order to prevent serious damage to the alternator system. By this invention, if a battery is connected to a rectifier in reverse polarity, or if the charging connections are short circuited, charging circuit relay means herein will not function. Hence, no damage can be caused to the battery charger or to the vehicle in which the battery is installed. The present invention, therefore, has been conceived to completely remove the human element from proper and improper battery charging connections.

There are two approaches to the problem of polarity control, one of which is to prevent connection of the D.C. charging circuit until correct polarity has been established. Otherwise, one prevents connection of full A.C. power to the battery charger until correct polarity has been established. Among the more desirable factors in successful application of a protective system such as the present, is its ability to sense extremely low voltages and operate therefrom. Additionally, such a system may provide operation of the battery charger on a completely dead battery such as does not normally provide adequate polarity sensing information. The respective basic and modified circuits described herein provide these features to a greater or lesser extent and each has its peculiar application under varying circumstances hereinafter described. These and other features and objectives will be apparent from the ensuing description and drawings in which:

FIGURE 4 illustrates a further modification of the invention;

FIGURE 5 illustrates a modification of FIGURE 4;

FIGURE 6 illustrates the preferred circuitry of the invention;

FIGURE 7 illustrates a modification of FIGURE 6;

FIGURE 8, appearing below FIGURE 7 on sheet 3 of the drawings, illustrates a further modification of the invention.

Figure 1:
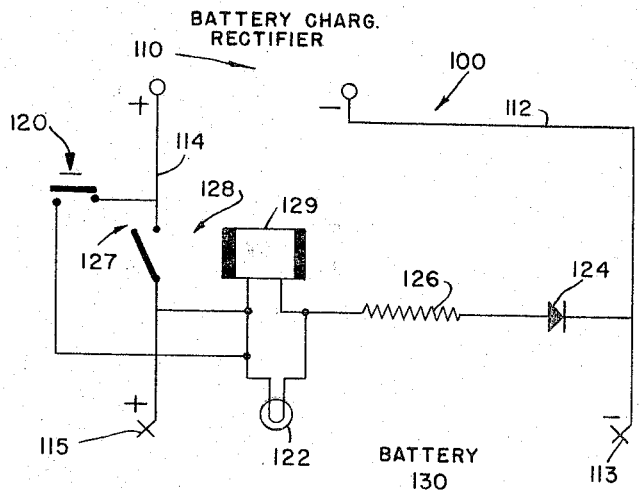
FIGURE 1 illustrates one circuit for carrying out the invention.

Referring specifically to FIGURE 1, it will be noted that the system 100 comprises a source 110 of D.C. power, which may be a battery charging rectifier, with leads 112 and 114 respectively terminating in battery connector clamps 113 and 115. Contacts 127 of relay 128 are of sufficient capacity to carry charging current in lead 112. Coil 129 is connected across the charging leads through rectifier 124, which permits the relay to operate only when the battery to be charged 130 is connected across the charger in the correct polarity. The combination of rectifier 124 and resistance 126 insures against energizing relay 128 should the clamps be connected to a battery in the wrong polarity. If a battery is connected in reverse polarity, or if the charging connections are short circuited, the relay will not operate and no damage can be caused to the rectifier or alternator system.

If in the FIGURE 1 system, where the battery to be charged does not develop sufficient voltage to operate the relay, push button 120, connecting relay coil 129 to rectifier 110, may be depressed momentarily with the rectifier supplying power, and the relay will pull in. Pilot light 122, connected across the relay coil, provides visual indication when correct connections have been made.

Figure 2:
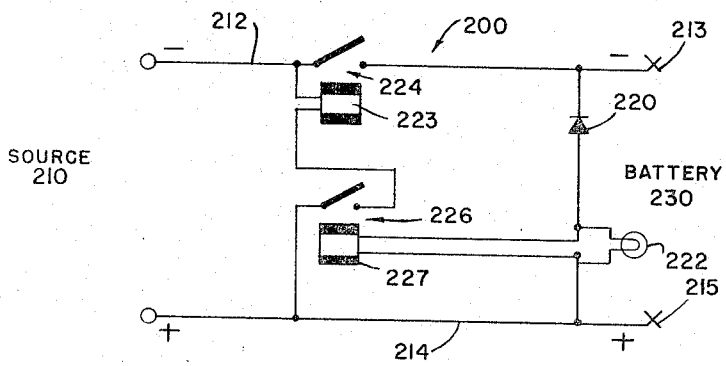
FIGURE 2 illustrates a modification of the invention of FIGURE 1.

In the FIGURE 2 modification, plural relays 224 and 226 are employed in system 200, rectifier 220 has a capacity sufficient only to carry current from the coil of relay 226. Normally open relay 226, thus, may be a sensitive relay, which by way of example only may have a contact rating of 3 amps and a coil rating of 1 to 12 volts. Relay 224, on the other hand, for example, may be given a contact rating of 150 amps, the coil rating thereof being 6 volts, 3 amps.

FIGURE 2 is a modification of FIGURE 1 in that relay 224, having coil 223, is connected on the battery charging rectifier or source side of the current interrupting contacts so that it always obtains its energy from the battery charger. This energy is switched by relay 226, having coil 227, which is connected in series with rectifier 220 across the battery charging leads on the battery side of the contacts of relay 224. In this configuration, relay 226 acts as the polarity control device. Thus, if the clamps are connected in the correct polarity, the contacts of relay 226 close, and relay coil 223 is then permitted to be operated from the battery charging rectifier as a source of energy. In effect, relay 226 is an improvement over push button 120 in the diagram of FIG. 1, since it automatically operates from storage batteries having very small amounts of energy, which would result from a discharged condition. As in FIGURE 1, energized pilot lamp 222 indicates a correct polarity connection.

Figure 3:
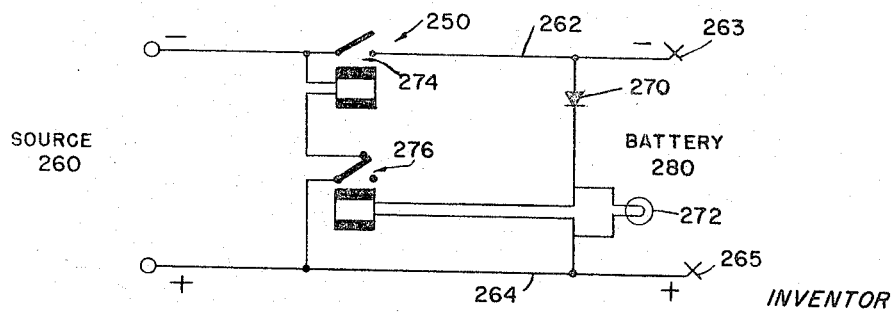
FIGURE 3 illustrates a modification of FIGURE 2.

FIGURE 3 illustrates polarity control system 250, which is closely related to system 200, the only difference being found in rectifier 270 and relay 276. In system 250 rectifier 270 is connected to pass current in a direction opposite from that indicated at clamps 263 and 265. Upon a current signal from the battery, normally closed relay 276 acts to separate its contacts, breaking the circuit which energizes relay 274. Thus, when connected in an improper polarity the charging circuit will not be completed. When a battery is connected in proper polarity contacts of relay 274 remain closed. Lamp 272 positively indicates wrong polarity.

FIGURE 4 illustrates, as a variation of system 200, system 300, in which an independent source of power operates relay 324. This modification is particularly desirable when using a relay of limited voltage range with a battery charger operating over a range of voltages. Power from its operation may be transformed and rectified from the same source that energizes the battery charging transformer rectifier or power source 310. Again, by way of example only, in this modification relay 324 may have a contact rating of 150 amps and a coil rating of 3 amps, Relay 326 operates over a 1 to 12 volts range and is extremely sensitive. A battery connected to clamps 313 and 315 in the polarity indicated in FIGURE 4 passes current through rectifier 320 causing relay 326 to close its normally open contacts. Lighted lamp 322 indicates that connections are in correct polarity.

FIGURE 5 illustrates a modification to FIGURE 4, in the same manner as system 250 modifies 200. Rectifier 370 is poled to pass current from a battery connected in polarity opposite that shown at clamps 363 and 365. If a battery is so connected, current therefrom actuates relay 376, disengaging its contacts and breaking the circuit to the coil of relay 374. Pilot lamp 372 indicates an erroneous connection.

Regarding FIGURE 6, in modification 400, there are shown plural transistors 420 and 440, connected in series to resistance 422 and 442 with interconnection to relay 424. Here, when a battery is properly connected to the respective positive and negative leads of system 400, current will flow from the battery through current limiting resistor 442 to the base of the transistor 440. This current will tend to make the base of transistor 440 positive, whereupon the transistor will conduct and permit current flow from emitter to collector. Current now will pass through current limiting resistor 422 to the base of the transistor 420. This flow being negative will cause the transistor to conduct, permitting conductance through relay 424, which will close its contacts and connect the charger output or source to the battery. On the other hand, if the charger leads are connected to the battery, in a manner opposite from that shown, the base of the first transistor 440 will be negatively biased, and consequently, it will not conduct nor will curent flow through the second transistor 420. With no current flowing, accordingly, the relay will not operate, and thus, will prevent connecting charger output to the battery.

FIGURE 7 suggests a modification to the device shown in FIGURE 6. In the earlier drawing transistors 420 and 440 were cascaded to provide an extremely sensitive polarity control, operative from a battery in all but a dead condition. System 450 operates in the same manner as 400, with the exception of reduced sensitivity caused by elimination of one stage of transistor amplification from system 400. Transistor 470, protected by current limiting resistor 472, acts as a switching device, completing the circuit to relay 474 upon forward base current flow from a battery connected in the proper polarity.

FIGURE 8 shows a modified system 600 in which the battery charging rectifier 602, similar to the battery charging rectifier referred to in connection with previous figures, is connected to three input leads 603, 604 and 605 leading from any suitable source of alternating current, not shown. The charger has positive output terminals 606 and 607 which are connected to the positive and negative battery conductors or leads 610 and 612, respectively. These battery leads 610 and 612 have connectors 611 and 613, in the form of battery clamps, which are designed to connect the leads 610 and 612 to the positive and negative terminals, respectively, of the battery to be serviced. A resistor 628 is normally interposed in conductor 605 between the conductor and the rectifier 602. A relay 616 has an "out" contact 609 and an "in" contact 614, the out contact 609 being engaged by movable switch blade 615 when the coil of relay 616 is de-energized. When the coil of relay 616 is energized, the movable switch blade engages the contact 614. It will be noted that when relay 616 is energized to cause engagement of movable switch blade 615 with contact 614, resistor 628 is shunted so that full line voltage is applied to the charger.

The modification of FIGURE 8 is designed to operate from the ripple voltage present if the battery clamps 611 and 613 are improperly connected to the battery. When they are properly connected, the battery operates as a filter, greatly reducing the ripple component of the voltage applied to the battery leads 610 and 612 by the charger 602. When the cables are improperly connected, however, this ripple voltage is relatively large and is employed to prevent energization of relay 616.

The energization of the coil of relay 616 is controlled by an N-P-N transistor 630 having the usual base, emitter and collector. The coil of relay 616 is connected in series with the emitter-collector circuit of transistor 630 between the battery leads 610 and 612 and is energized whenever sufficient emitter-collector current flows. The potential of base 630 with respect to the emitter is controlled by a network including a resistor 634, rectifiers 624 and 624', condensers 626 and 622, and resistor 620. The base of transistor 630 is connected to the junction of condenser 622 and resistor 620 which are connected in series between battery leads 610 and 612. Normally, considering only the direct current voltage existing between battery leads 610 and 612, the condenser 622 will have a charge across it substantially equal to the potential between battery leads 610 and 612 so that the base 630 will be substantially at the negative potential of battery lead 612 and a substantial current can flow through the emitter-collector circuit of transistor 630 and through the relay coil of relay 616 to energize the latter. When the battery leads are properly connected, this is the condition that exists and switch blade 615 of relay 616 will be in engagement with contact 614 to apply full line voltage to charger 602.

Where the battery leads are incorrectly connected to the battery, the battery has relatively little filtering effect. Under these conditions, the condenser 626 acquires a substantial voltage across it, the polarity of this voltage being such that the upper terminal of condenser 626 is positive with respect to the lower terminal. This voltage results from the series circuit from battery lead 610 through resistor 634, rectifier 624 and condenser 626 to the negative battery lead 612. Since current can flow through this circuit only on the positive cycles of the ripple, the voltage across the condenser 626 will assume the polarity indicated above and indicated by the legend on the drawing. This positive voltage is applied through rectifier 624' to the base of transistor 630 to raise the potential of the base with respect to the emitter sufficiently to cut off transistor 630 and prevent energization of relay 616. The condenser 622 serves to filter out part of the pulsations in the voltage between the base and emitter due to the voltage drop across resistor 634.

From the above, it will be apparent that when the charger cables are properly connected to a battery, transistor 630 is conductive and energizes relay 616. When they are improperly connected, a charge is built up on condenser 626 due to the ripple voltage and the relay 616 is de-energized.

Resistor 634 reduces the circuit sensitivity to the small amount of ripple voltage present when the battery leads are properly connected.

Resistor 628 permits sufficient current to flow into the charger, even with relay 616 de-energized, to provide a charger output that will operate the polarity protecting circuit. When the charger is properly connected to a battery, this limited charger output will build up sufficient voltage, as for instance 4½ volts, for relay 616 to become energized, thereupon applying full line voltage to the charger.

A further relay 614 is provided to prevent the relay 616 overheating while charging a 12-volt battery. Relay 614 is designed to pull in only when there is 12 volts across the charger terminals. The relay 614 controls a switch 635 which normally shunts a resistor 618 when relay 614 is de-energized. When, however, the charger cables 610 and 612 have 12-volt supplied to them, the relay 614 pulls in to open relay switch 635 and remove the shunt around resistor 618 in series with the coil of relay 616. This puts the resistor 618 effectively in series with the coil of relay 616 and reduces the current flow therethrough to a value such that no injury will be caused to the relay.

A signal light 632 is connected between alternating current conductors 604 and 605 when relay 616 is de-energized causing engagement of switch blade 615 without contact 609. Under these conditions, signal light 632 is energized to indicate that the charger cable clamps 611 and 613 have not been properly connected to the battery.

The foregoing description and drawings define the invention and its modifications specifically; nevertheless, the invention is to be construed in the light of the appended claims, various other equivalent means being obvious. For example, the transistors shown herein may be interchangeable for their complementary types; namely PNP for NPN or NPN for PNP. In such a case suitable modifications to the overall circuitry would be made to establish correct polarity and/or current flow.

What is claimed is:

1. In a battery charger having a plurality of input leads adapted to be connected to an alternating power source and having output terminals across which is provided a D.C. output voltage having a ripple component therein, a plurality of battery leads connected to said output terminals and having connectors adapted to be connected to a battery to be serviced, switching means connected to at least some of said leads and effective in a first condition thereof to cause a full charging voltage to be applied through said connectors to said battery and in a second condition thereof to prevent a full charging voltage from being applied to said battery, and controlling means for controlling the operation of said switching means and comprising means connected across said battery leads and responsive to the ripple component of the D.C. output voltage, said controlling means being effective when the battery lead connectors are connected to a battery to be serviced in the correct polarity, so that the ripple component of the voltage is relatively small, to cause said switching means to assume said first condition in which a full charging voltage is applied to said battery and effective when said battery lead connectors are connected to such a battery in the wrong polarity to respond to the ripple voltage present to cause said switching means to assume said second condition in which a full charging voltage is not applied to said battery.

2. The battery charger of claim 1 in which said controlling means for said switching means comprises a rectifier and a capacitor connected across said battery leads, said capacitor being effective when a substantial ripple voltage is present across said battery leads to assume a charge of such polarity as to cause said switching means to assume said second condition.

3. The battery charger of claim 2 in which said controlling means further includes a transistor for controlling the operation of said switching means and in which said capacitor is connected to the input terminals of said transistor for controlling the conductivity thereof.

4. The battery charger of claim 1 in which said switching means is a relay having a relay coil and switching contacts and in which said controlling means includes a transistor connected to said relay coil to control the energization thereof and a rectifier and a capacitor connected across said battery leads, said capacitor being connected to the input terminals of said transistor to control the conductivity thereof.

5. The battery charger of claim 1 in which there is an impedance in one of the input leads to reduce the output voltage and in which said switching means is effective in said first condition to shunt said impedance.

References Cited by the Examiner
UNITED STATES PATENTS 2,818,543  12/1957  Dodge _____ 320—2 X
3,085,187   4/1963  Godshalk _____ 320—25

JOHN F. COUCH, *Primary Examiner.*

LLOYD McCOLLUM, *Examiner.*

S. WEINBERG, G. H. GERTSMAN,
*Assistant Examiners.*